United States Patent
Fischer (10) Patent No.: US 8,565,750 B2
(45) Date of Patent: Oct. 22, 2013

(54) CUMULATIVE NEIGHBORING CELL LIST

(75) Inventor: Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 512 days.

(21) Appl. No.: 12/305,912

(22) PCT Filed: Jun. 19, 2007

(86) PCT No.: PCT/KR2007/002970
§ 371 (c)(1),
(2), (4) Date: Dec. 19, 2008

(87) PCT Pub. No.: WO2007/148911
PCT Pub. Date: Dec. 27, 2007

(65) Prior Publication Data
US 2010/0234010 A1    Sep. 16, 2010

Related U.S. Application Data

(60) Provisional application No. 60/805,461, filed on Jun. 21, 2006.

(51) Int. Cl.
*H04W 4/00* (2009.01)

(52) U.S. Cl.
USPC .................................. 455/422.1; 455/435.1

(58) Field of Classification Search
USPC ........ 455/422.1, 434, 435.1, 435.2, 436, 440, 455/441, 524, 63.2, 67.11
See application file for complete search history.

(56) References Cited

U.S. PATENT DOCUMENTS

| 5,884,176 | A | 3/1999 | Vaara | |
|---|---|---|---|---|
| 6,360,098 | B1 | 3/2002 | Ganesh et al. | |
| 6,553,232 | B1 * | 4/2003 | Shaffer et al. | 455/440 |
| 6,917,809 | B2 | 7/2005 | Horwath et al. | |
| 7,013,141 | B2 | 3/2006 | Lindquist et al. | |
| 7,082,305 | B2 * | 7/2006 | Willars et al. | 455/441 |
| 2004/0152480 | A1 | 8/2004 | Willars et al. | |
| 2005/0107085 | A1 * | 5/2005 | Ozluturk | 455/439 |
| 2007/0042775 | A1 * | 2/2007 | Umatt et al. | 455/434 |

FOREIGN PATENT DOCUMENTS

| JP | 2002521857 | 7/2002 |
|---|---|---|
| JP | 2003507981 | 2/2003 |
| JP | 2003534675 | 11/2003 |
| JP | 2006094383 | 4/2006 |
| TW | 343419 | 10/1998 |
| TW | I249360 | 2/2006 |
| WO | 2009/057729 | 5/2009 |

\* cited by examiner

*Primary Examiner* — Kent Chang
*Assistant Examiner* — Nelson Rosario
(74) *Attorney, Agent, or Firm* — Lee, Hong, Degerman, Kang & Waimey (57) ABSTRACT

A method is provided that reduces the overhead of neighboring cells that must be signaled and thereby reduces the overhead in the system information and reduces the number of cells on which a UE must perform measurements. In order to accomplish this, the number of neighboring cells (inter frequency/inter RAT) that are broadcast in the system information is reduced.

4 Claims, 6 Drawing Sheets

Layer I, 5MHz

Layer II, 5MHz

CUMULATIVE NEIGHBORING CELL LIST

TECHNICAL SOLUTION

This application is the National Stage filing under 35 U.S.C. 371 of International Application No. PCT/KR2007/002970, filed on Jun. 19, 2007, which claims the benefit of U.S. Provisional Application Ser. No. 60/805,461, filed Jun. 21, 2006, the contents of which are hereby incorporated by reference herein in their entirety.

DISCLOSURE OF INVENTION

The present invention relates generally to wireless communication systems, and in particular to a method for informing neighboring cells to terminals and for measuring the neighboring cells.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Figure 1:
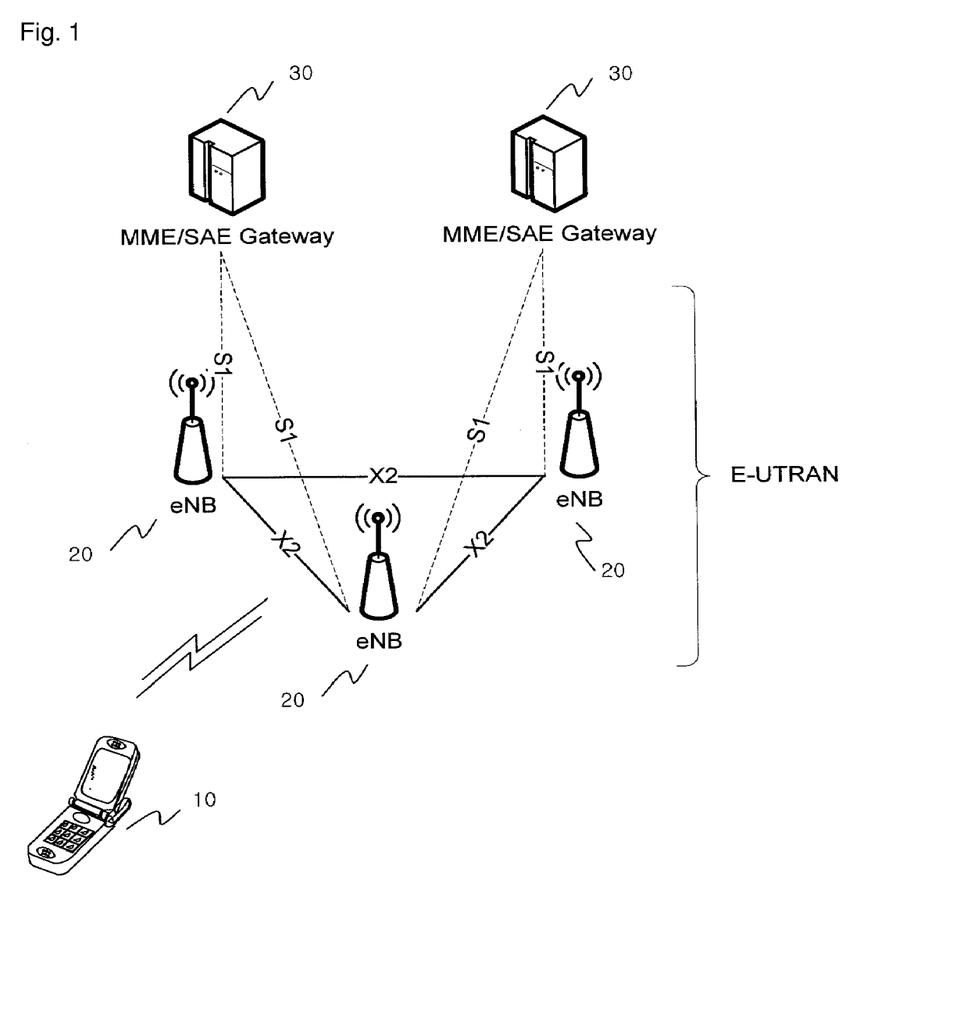
FIG. 1 is a block diagram illustrating a communication network, such as an evolved universal mobile telecommunication system (E-UMTS).

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2:
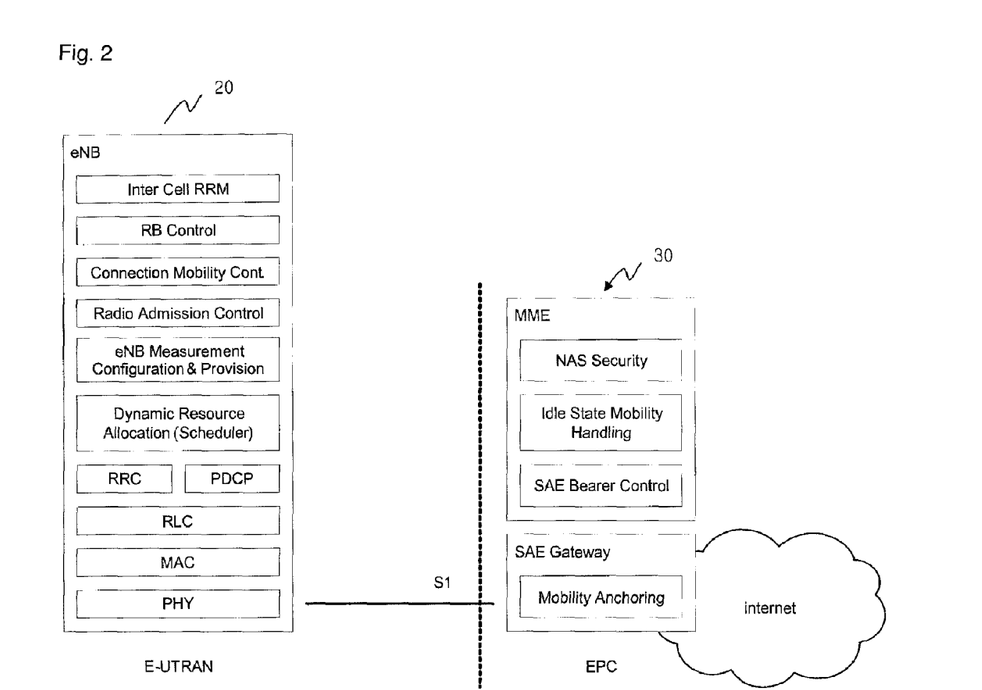
FIG. 2 is a block diagram depicting architecture of a typical E-UTRAN and a typical EPC.

FIG. 2 is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

Figure 3:
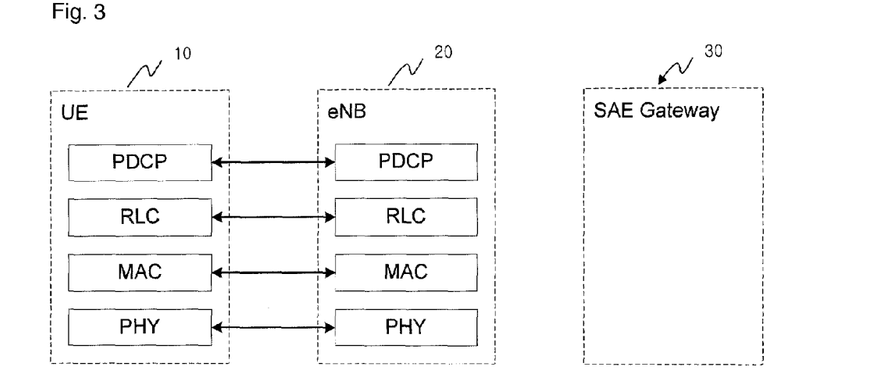
FIG. 3 is a block diagram depicting the user-plane protocol stack for the E-UMTS.
Figure 4:
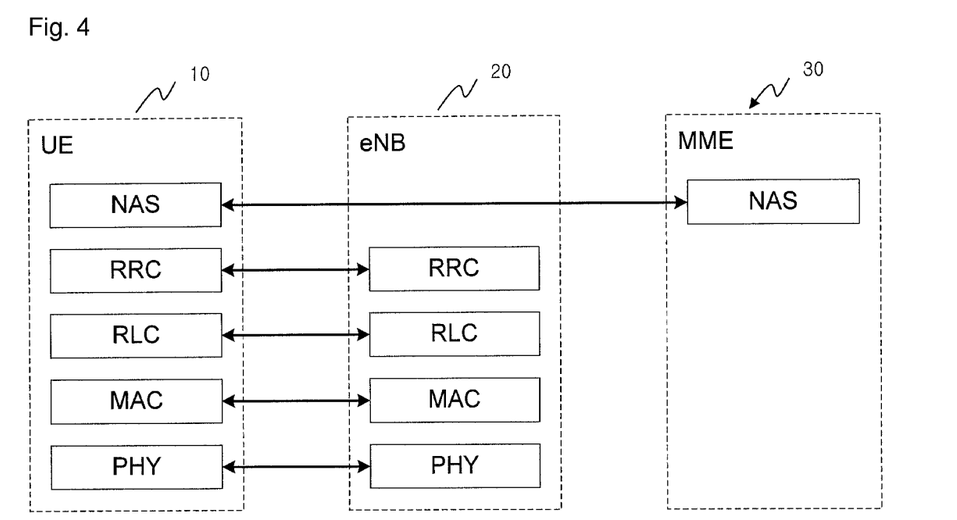
FIG. 4 is a block diagram depicting the control-plane protocol stack for the E-UMTS.

FIGS. 3 and 4 are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3, the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 4, the RLC and MAC layers (terminated in an eNodeB 20 on the network side) perform the same functions as for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

As terminals are adapted to receive more and more different radio access technologies (RAT), such as GSM, UMTS, and W-LAN, a UE 10 must measure the availability of the radio access technology in order to select the best radio access technology. It is, therefore, desirable that the UE 10 know about the different neighboring cells and the different access technologies that are available in order to perform efficient measurements.

In conventional methods employed in, for example, the UMTS standard, the UE 10 may select a first cell of the radio access technology and check the suitability based on different criteria. The UE 10 then registers to the network and maintains a connection to this network by receiving system information and listening to paging messages. In other words, the UE 10 camps on a cell from the network.

The UE 10 reads system information from the selected cell to obtain information on the neighboring cells of the network in order to maintain the connection to the network. The neighboring cells include cells from the same technology on the same frequency, cells from the same technology on different frequencies, and cells from different technologies on different frequencies.

The UE 10 will periodically perform measurements based on a list of neighboring cells in order to reselect better cells according to a radio criteria. If the reception quality of the cell that the UE is camping on degrades below a certain level, the cell is no longer suitable and the UE 10 is then allowed to take into account cells that are not included in the neighboring cell list of the last cell upon which the UE was camped in order to again find a suitable cell.

Figure 5:
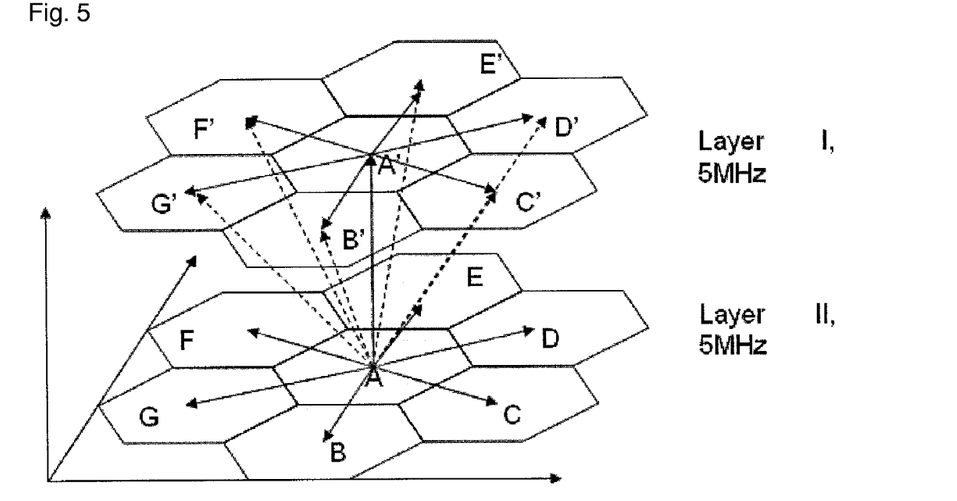
FIG. 5 illustrates an example of two frequency layers with collocated cells.

FIG. 5 illustrates a typical situation where two frequencies are deployed. In this situation, the number of neighboring cells that must be broadcasted in a given cell essentially doubles. If only the lower frequency is deployed (Layer II), a cell such as cell A would only need to broadcast to neighboring cells B, C, D, E, F and G. However, if the second frequency is also deployed (Layer I), cells A', B', C', D', E', F' and G' must be broadcast in cell A. If the UE 10 is able to use two different access technologies, such as UMTS and GSM, or UMTS and LTE, the situation is similar, although there are some additional impacts due to the fact that the coverage of the different technologies might not be the same.

Figure 6:
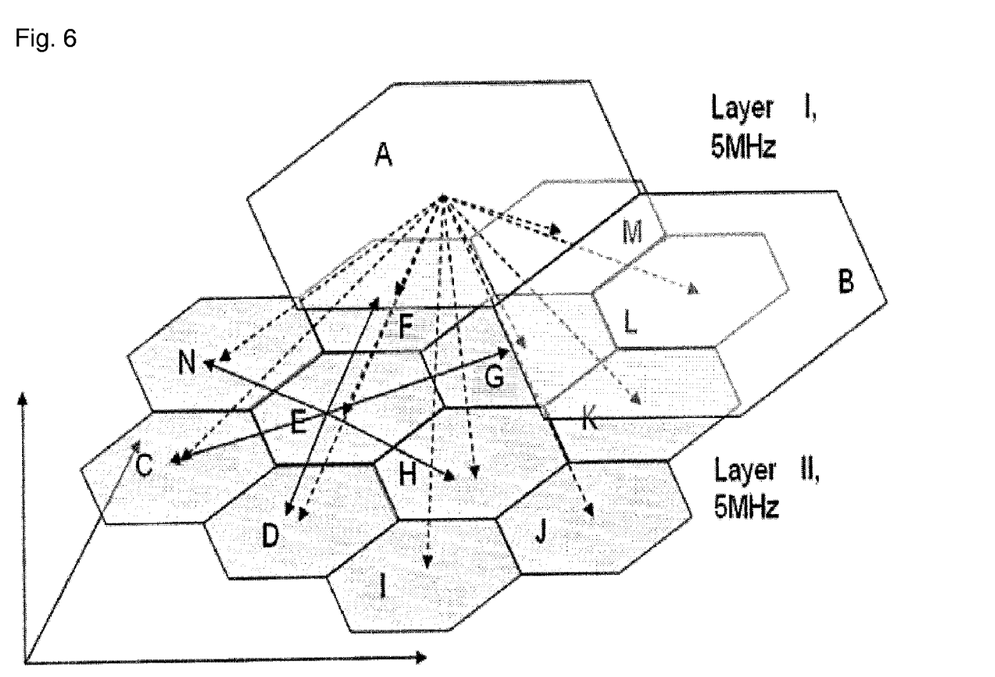
FIG. 6 illustrates an example of an hierarchical cell structure.

Another typical situation is the hierarchical cell structure illustrated in FIG. 6. In this situation, cells with different sizes are deployed in different frequencies, where cell A and B (Layer I) are called macrocells and the remaining cells shown from cells C to N (Layer II) are micro cells from the underlying layer.

Because the capacity per cell for macro and micro cells is essentially the same and the number of micro cells in a given area is much higher than the number of macro cells, the capacity of the layer of micro cells, or the data rate per square km, is much higher for the micro cell layer. However since the cells are much smaller, a UE 10 that is moving quickly will need to reselect cells frequently.

In such a situation, the macrolayer needs to broadcast all cells from the micro layer. For example, cell A would need to broadcast all the micro cells that are in the coverage area of the macro cell in addition to the neighbors of the same layer. Because there are many more micro cells in the coverage area of a macro cell, the burden on the system information volume is very high for the macro cell. Furthermore, a UE 10 in the macro cell needs to measure on many more neighbouring cells than a UE in the micro cell.

In the scope of LTE, the assumption is that a UE is able to receive a minimum bandwidth of 10 MHz, while the minimum bandwidth for a cell is 1.25 MHz. Given the situation of a hierarchical cell structure illustrated in FIGS. 3 and 4, eight cells of 1.25 MHz could be collocated on different frequencies, thereby implying a huge number of neighboring cells. Another possibility is that the UE 10 reads the system information of at least two cells simultaneously, such as from layer I and II illustrated in FIG. 5, instead of indicating all neighbors of one frequency.

LTE might be used, for example, in a "hotspot" scenario, where LTE cells would be used as pico cells together with an overlay UMTS/GSM network. In such a situation, many LTE cells would potentially need to be broadcast in the UMTS/GSM system information if all neighboring cells need to be listed. For a situation where cells from different RATs or from the same RAT on different frequencies are co-located in the same area, it is also possible that the UE can read system information from different RATs and combine the cell info lists from system information from different cells depending on the receiver structure.

If many different frequencies and technologies are listed as neighboring cells, the overhead due to the broadcasting of the neighboring cells becomes excessive. Furthermore, the impact on terminal power consumption becomes very high when the terminal must measure on many cells simultaneously.

In one aspect of the present invention, a method for generating a list of cells is provided. The method includes receiving an indication from a selected first network node communicating at a first frequency, wherein said indication indicates a second frequency at which a first set of neighbor network nodes operate, wherein said second frequency is different from said first frequency, receiving system information from a second network node according to said indication and identifying a set of candidate neighbor network nodes based upon said system information received, wherein said set of candidate neighbor network nodes is included in said first set of neighbor network nodes, and wherein said set of candidate neighbor network nodes includes an identity of at least one network node that is different from an identity of said second network node.

It is contemplated that said indication further indicates a presence of said second network node. It is further contemplated that the method further includes generating a master neighbor list including said first set of neighbor network nodes and said set of candidate neighbor network nodes.

It is contemplated that said system information is received simultaneously with a communication from said selected first network node. It is further contemplated that the method further includes receiving a list from said selected first network node, receiving a list of allowed identification tags from said second network node and excluding said second network node from said set of candidate neighbor network nodes if an identification tag associated with said second network node is not included in said list.

It is contemplated that the method further includes identifying a second set of neighbor network nodes which are communicating at said first frequency and generating a combined neighbor list including said first set of neighbor network nodes and said second set of neighbor network nodes. It is further contemplated that the method further includes identifying a time period that user equipment (UE) continuously remains in a coverage area of said selected first network node and performing said identifying of said set of candidate neighbor network nodes only if said time period exceeds a predetermined amount of time.

It is contemplated that the method further includes identifying a rate of speed of user equipment (UE) and performing said identifying of said set of candidate neighbor network nodes only if said rate of speed exceeds a predetermined rate. It is further contemplated that the method further includes measuring reception quality of a signal from said second network node and performing said receiving system information from said second network node only if said reception quality exceeds a predetermined level.

In another aspect of the present invention, a method for generating a list of cells is provided. The method includes receiving an indication from a selected network node communicating at a first frequency, wherein said indication indicates a second frequency at which a first set of neighbor network nodes operate, wherein said second frequency is different from said first frequency and receiving a black list from said selected network node, wherein said black list identifies at least one network node of said first set of neighbor network nodes that is not a candidate network node. Preferably, the method further includes identifying a second set of neighbor network nodes that are communicating at said first frequency and generating a combined neighbor list including said first set of neighbor network nodes and said second set of neighbor network nodes.

In another aspect of the present invention, a method for generating a list of cells is provided. The method includes receiving an indication from a selected first network node communicating at a first frequency, wherein said indication indicates a second frequency at which a first set of neighbor network nodes operate, wherein said second frequency is different from said first frequency, receiving a source list from a second network node and excluding said second network node as a candidate network node depending on a presence or absence of said selected first network node in said source list.

It is contemplated that said excluding further includes excluding said second network node as said candidate network node if said selected first network node is absent from said source list. It is further contemplated that said excluding further includes excluding said second network node as said candidate network node if said selected first network node is present in said source list. Preferably, the method further includes identifying a second set of neighbor network nodes that are communicating at said first frequency and generating a combined neighbor list including said first set of neighbor network nodes and said second set of neighbor network nodes.

In another aspect of the present invention, a method for generating a list of cells is provided. The method includes communicating from a selected first network node an indication to user equipment (UE) at a first frequency, wherein said indication indicates a second frequency at which a first set of neighbor network nodes operate, wherein said second frequency is different from said first frequency, including in system information a set of candidate neighbor network nodes, wherein said set of candidate neighbor network nodes is included in said set of neighbor network nodes, and wherein said set of candidate neighbor network nodes includes an identity of at least one network node that is different from an identity of a second network node that operates at said second frequency and communicating said system information from said second network node.

It is contemplated that said indication further indicates a presence of said second network node. It is further contemplated that the method further includes communicating a list from said selected first network node, communicating a list of allowed identification tags from said second network node and excluding said second network node from said set of candidate neighbor network nodes if an identification tag associated with said second network node is not included in said list from said selected first network node.

In another aspect of the present invention, a method for generating a list of cells is provided. The method includes communicating an indication from a selected network node communicating at a first frequency, wherein said indication indicates a second frequency at which a first set of neighbor network nodes operate, wherein said second frequency is different from said first frequency and communicating a black list from said selected network node, wherein said black list identifies at least one network node of said first set of neighbor network nodes that is not a candidate network node.

In another aspect of the present invention, a method for generating a list of cells is provided. The method includes communicating an indication from a selected first network node operating at a first frequency, wherein said indication indicates a second frequency at which a first set of neighbor network nodes operate, wherein said second frequency is different from said first frequency, compiling a source list, said source list including or excluding said selected first network node to indicate that said second network node is excluded from a set of candidate network nodes and communicating said source list from a second network node.

It is contemplated that said second network node is excluded as a candidate network node if said selected first network node is excluded from said source list. It is further contemplated that said second network node is excluded as a candidate network node if said selected first network node is included in said source list.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

Reference will now be made in detail to the preferred embodiments of the present invention, examples of which are illustrated in the accompanying drawings. Wherever possible, the same reference numbers will be used throughout the drawings to refer to the same or similar parts.

The present invention provides a method that reduces the overhead of neighboring cells that must be signaled and thereby reduces the overhead in the system information and reduces the number of cells on which a UE must perform measurements. In order to accomplish this, it is important to reduce the number of neighboring cells (inter frequency/inter RAT) that are broadcast in the system information.

Embodiments of the present invention propose that a UE reselect between cells for which no detailed information, such as frequency and type of RAT, and cell specific information such as a cell specific scrambling code and BSIC (Base transceiver Station Identity Code), is sent on the cell on which the cell is currently camping, but still allows the UE to perform efficient measurements.

It is desirable that the UE perform measurements only when necessary in order to reduce battery consumption. It is possible to link neighboring cells together, such as by indicating to the UE that cells in the same area have similar coverage, in order to reduce the number of neighboring cells on which the UE should perform measurements and, specifically, the number of inter frequency/inter RAT neighboring cells on which the UE should perform measurements.

This would allow the UE to perform measurements only when the likelihood of having a good reception quality is high. For example, a UE that has selected a first cell performs measurements on a third cell only when a second cell to which the third cell is linked has reached a predefined quality target. In the example illustrated in FIG. 5, the first cell might be A, the second cell might be B, and the third cell might be B'.

Various embodiments of the present invention reduce the number of neighboring cells that need to be broadcast and the number of cells on which the UE is required to measure. Two main situations are differentiated since they are very common and most in need of enhancement.

The first situation involves a Macro cell that covers the same area as many micro or pico cells. In that situation, the number of potential neighboring cells that would need to be broadcast and that would need to be measured by a UE 10 would be very high.

The second situation involves collocated cells. The easiest way to increase capacity is to add other frequencies on the existing eNodeB's 20, thereby doubling the number of neighboring cells that must be broadcast.

Macro to Micro Cells

One approach is to list the frequencies of the neighboring cells, such as center frequency and bandwidth, for each type of radio access technology instead of indicating the neighboring cell list in different layers. In this way, a UE 10 can limit the search of neighboring cells on a given layer. Once the UE 10 detects the presence of neighboring cells in the different layer it would then read system information, or at least portions of the system information, of the cells in that different layer in order to determine whether the cells can be selected.

The UE 10 would only read system information, or portions of the system information, in a different layer when the quality of the cell is above a certain limit in order to reduce the time spent for the reception of quality measurements or the reception of system information of the neighboring cells. The limit might be provided via dedicated signaling or on the system information on the cell on which the UE 10 is presently camping.

The UE 10 may be provided with a list of cells on a different layer in the vicinity of the current cell that should not be selected, or a "black list" of cells, in order to prevent that UE from taking those specific cells into account in the evaluation. In this way, the UE 10 does not unnecessarily read system information. The "black list" can be provided via the system information or via dedicated signaling in the cell on which the UE 10 is currently camping.

It is not necessary for a UE 10 to start reading the system information of smaller cells in a different layer immediately after entering a new macro cell when camping on a macro cell in a hierarchical cell structure since selecting a smaller cell is only useful when the UE has a relatively low speed. Therefore, another enhancement when all neighboring cells in different layers are not broadcast is for a UE 10 to read system information on a given layer only after a predetermined time has elapsed after the UE enters the macro cell, such that the UE does not immediately receive system information or measure on a specific layer after cell reselection. In this way, unnecessary measurements and reception of system information may be prevented.

Another approach is to send the different pilots of the cells in a given layer in a so called SFN (Single Frequency Network) operation where neighboring cells in the same frequency band send the same time-aligned information such that UEs 10 perceive the signal received from different antennas as if it was sent for one antenna. This method may be used for efficient cell search in order to send a specific carrier for a given cell group.

This approach may be used in such a configuration in order to allow measurement of the reception quality of a given layer and, thereby, only the pilot sequences of the cell on which a UE 10 is currently camping need be indicated instead of indicating the different cells. The UE 10 would start determining specific cells using a specific pilot, such as the strongest, and start receiving the system information of that cell only after the quality of the pilot sequence measured by the UE exceeds a certain threshold.

In order to prevent a situation where a UE 10 selects from a first cell to a second cell, such as for RRM (Radio Resource Management) reasons, even though the second cell is much better from a radio point of view, a list of cells from which the UE is allowed to select to the second cell B can be indicated in the second cell. For example, if a UE 10 is allowed to select to cell B only from cell C, then only cell C would be indicated in the "allowed source cell list" sent via the system information of cell C and a UE from cell A would not select cell B after receiving system information from cell B. Another possibility is to indicate cell A in a "forbidden source cell" list.

Co-Located Cells

In the situation of co-located cells, where the same locations are used for cells from several different RATs or frequencies, the intra frequency neighboring cells that must be broadcast for each layer are normally similar, as illustrated in FIG. 5. For example, the intra frequency neighbors of cell A' in layer I are cells B', C', D', E', F' and G' and the neighbors of cell A in layer II are cells B, C, D, E, F and G.

Therefore, an efficient solution for reducing the number of neighboring cells that are broadcast is to create a rule that allows determination of a list of neighboring cells in a different layer from a list of neighboring cells of the cell on which a UE 10 is camping. In the example illustrated in FIG. 5, when a UE 10 camping on cell A' on layer I receives the information on the neighboring cells B', C', D', E', F' and G', it is sufficient to add the information that the same neighbors are also available on the other layer and, therefore, the UE can assume that the neighboring cells in layer II are A, B, C, D, E, F and G and are also included in the neighboring cell list.

Non Collocated Cells

In the situation that cells on different layers are not co-located, it also is possible to indicate in the system information of one or more cells, potentially in a different layer and with similar coverage from the current cell that a UE 10 has selected, that the UE is also allowed to select to neighboring cells indicated as intra-frequency or inter-frequency cells. Other specific rules could also be defined, such as indicating in the neighboring cell list of the one or more cells which portion of the cell info list may be combined with the neighbouring cell of a given cell on which the UE 10 is camping.

Generally, indicating intra-frequency cells of different layers that have similar coverage, such as same coverage like collocated cells or cells that have larger or smaller coverage, may reduce the number of cells on which a UE 10 performs measurements. The UE 10 then only starts measurements of the cells of different layers after one or more of the cells with similar coverage have a certain quality. When a specific ID of the cell on which the UE is camping is broadcast via the system information of the neighboring cells, the UE 10 can identify that the cell belongs to a set of allowed cells using this "Set Id".

The present invention allows reduction of the number of cells that must be broadcast and the number of cells that a UE 10 must measure. The present invention is applicable to the LTE standards as well as to existing standards, such as GSM or UMTS.

Figure 7:
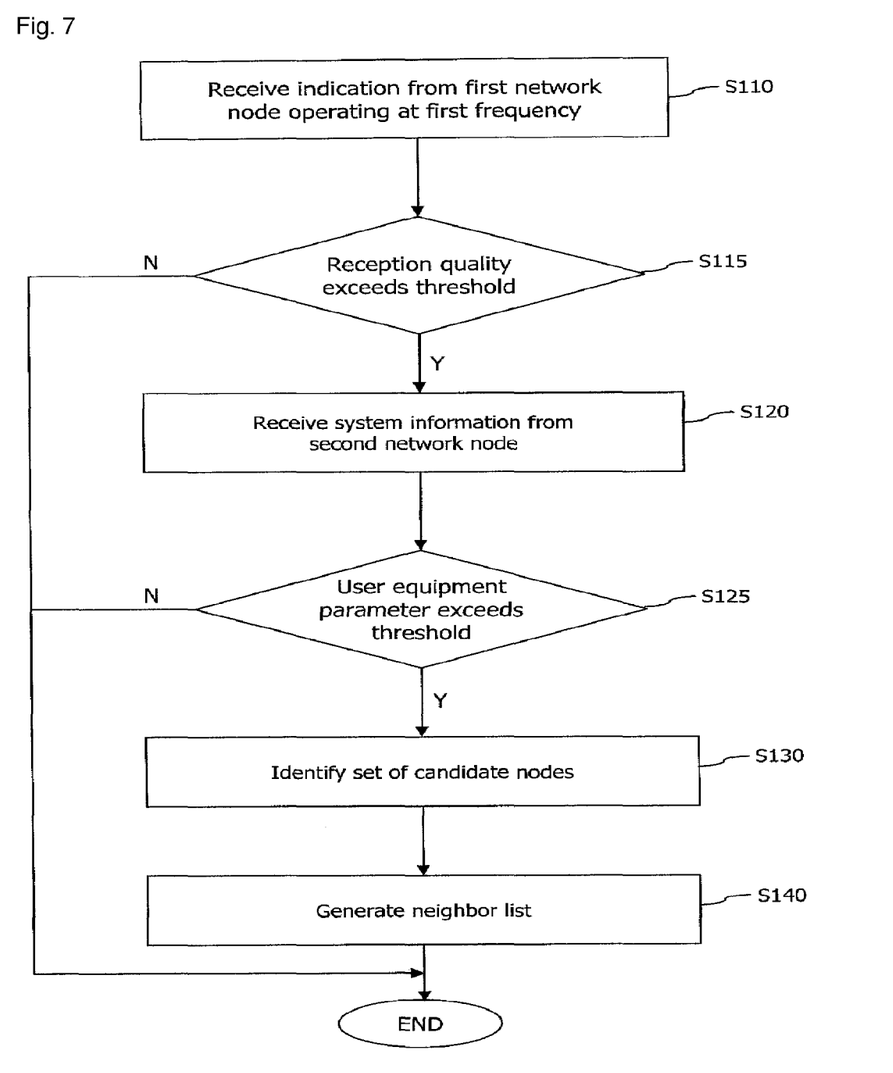
FIG. 7 illustrates a method of generating a list of cells according to one embodiment of the present invention.

FIG. 7 illustrates a method for generating a list of cells according to one embodiment of the present invention. As illustrated in FIG. 7, an indication is received from a selected first network node communicating at a first frequency (S110). The indication indicates a second frequency at which a first set of neighbor network nodes operate. The second frequency is different from the first frequency. The indication may also indicate the presence of the second network node.

System information is then received from a second network node according to the indication that was received from the first network node (S120). The system information may be received simultaneously with a communication from the selected first network node.

Receipt of the system information from the second network node may be conditional. Quality of a signal from the second network node is measured and the system information is received only if the reception quality exceeds a predetermined level (S115).

Once the system information is received, a set of candidate neighbor network nodes is identified based upon the received system information (S130). The set of candidate neighbor network nodes is selected from the first set of neighbor network nodes and includes an identity of at least one network node that is different from an identity of the second network node.

Identifying the set of candidate neighbor network nodes may be conditional. Either a rate of speed of a UE 10 or a time period that a UE continuously remains in a coverage area of the selected first network node is identified. The set of candidate neighbor network nodes is only identified if the time period exceeds a predetermined amount of time or the rate of speed exceeds a predetermined rate (S125).

The second network node may be excluded from the set of candidate neighbor network nodes. In order to determine whether to exclude the second network node, a list is received from the selected first network node and a list of allowed identification tags is received from the second network node, with the second network node excluded from the set of candidate neighbor network nodes if an identification tag associated with said second network node is not included in the list.

A neighbor list may also be generated (S140). The neighbor list may be a master list that includes the first set of neighbor network nodes and the set of candidate neighbor network nodes. The neighbor list may be a combined neighbor list that includes the first set of neighbor network nodes and a second set of neighbor network nodes that are identified as communicating at the first frequency.

Figure 8:
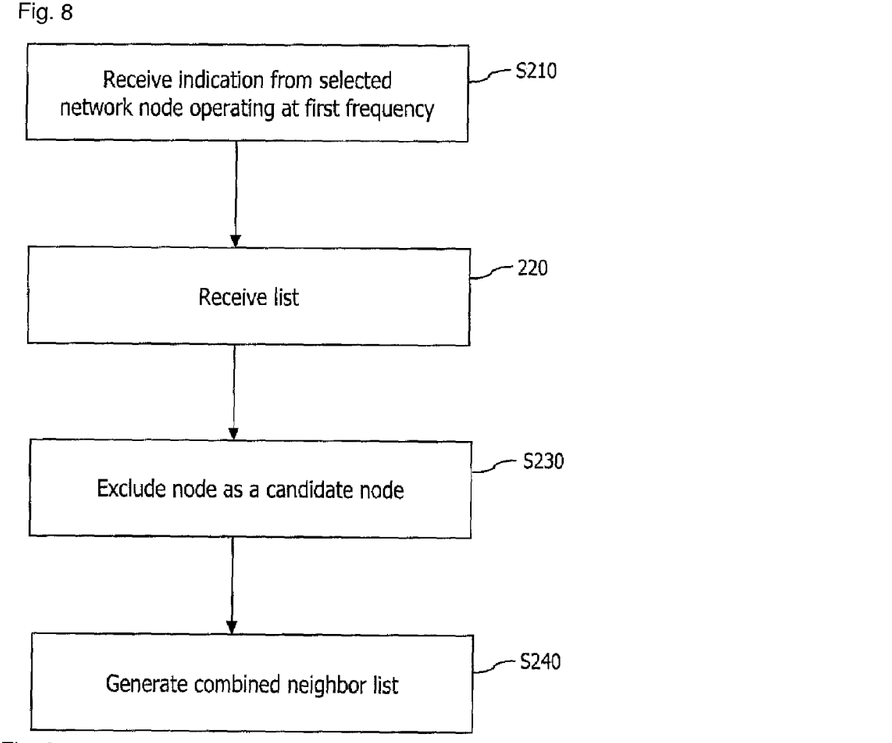
FIG. 8 illustrates a method of generating a list of cells according to another embodiment of the present invention.

FIG. 8 illustrates a method for generating a list of cells according to another embodiment of the present invention. As illustrated in FIG. 8, an indication is received from a selected network node communicating at a first frequency (S210). The indication indicates a second frequency at which a first set of neighbor network nodes operate. The second frequency is different from the first frequency A list is then received from the selected network node (S220). The list is then used to exclude at least one node as a candidate node (S230).

The list may be a black list that identifies at least one network node of the first set of neighbor network nodes that is not a candidate network node. The list may be a source list, with the second network node excluded as a candidate network node depending on a presence or absence of the selected first network node in the source list. It is contemplated that the second network node may be excluded if the selected first network node is absent from the source list or, alternately, the second network node may be excluded if the selected first network node is present in the source list.

The method may further include generating a combined neighbor list (S240). A second set of neighbor network nodes are identified that are communicating at the first frequency, with the combined neighbor list including the first set of neighbor network nodes and the second set of neighbor network nodes.

Figure 9:
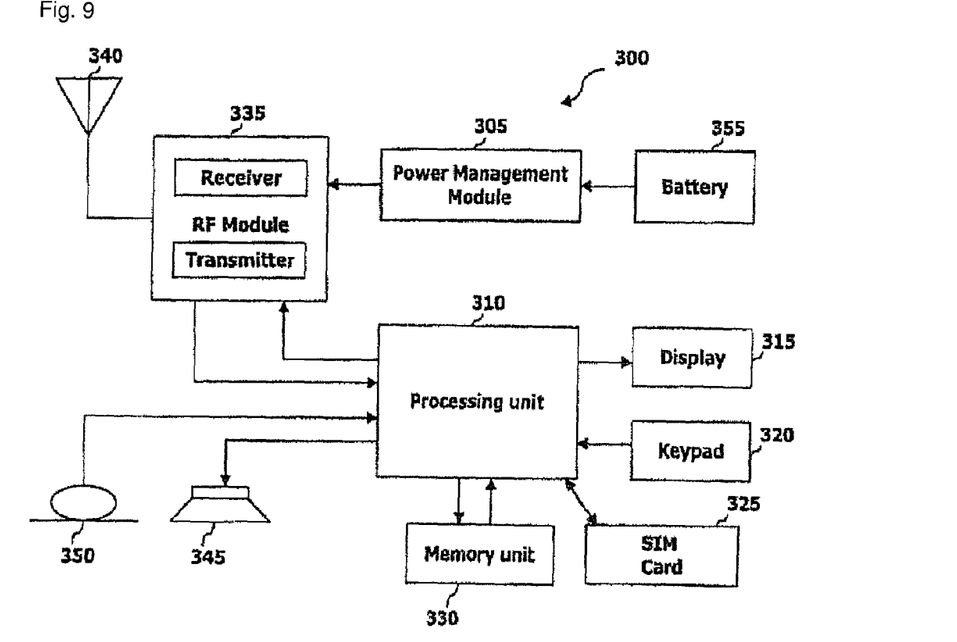
FIG. 9 is a block diagram of a mobile communication terminal according to the present invention.

FIG. 9 illustrates a block diagram of mobile communication device 300, which may be configured as a UE 10 in accordance with embodiments of the present invention. The mobile communication device 300 is illustrated, for example, as a mobile phone and may be configured to perform various methods described herein.

The mobile communication device 300 includes a processing unit 310, RF module 335, power management module 305, antenna 340, battery 355, display 315, keypad 320, optional subscriber identify module (SIM) card 325, memory unit 330, speaker 345 and microphone 350. The processing unit 310 may be a microprocessor or digital signal processor. The memory unit 330 may be a flash memory, ROM or SRAM.

A user enters instructional information, such as a telephone number, by pushing the buttons of keypad 320 or by voice activation using microphone 350. Processing unit 310 receives and processes the instructional information to perform the appropriate function, such as dialing the entered telephone number. Operational data may be retrieved from memory unit 330 to perform the function. Furthermore, processing unit 310 may display the instructional and operational information on display 315 for the user's reference and convenience.

Processing unit 310 issues instructional information to RF section 335, to initiate communication, such as transmitting radio signals comprising voice communication data. RF section 335 includes a receiver and a transmitter to receive and transmit radio signals. Antenna 340 facilitates the transmission and reception of radio signals.

Upon receiving radio signals, RF module 335 may forward and convert the signals to baseband frequency for processing by processing unit 310. The processed signals are transformed into audible or readable information output via speaker 345, for example.

Processing unit 310 is adapted to perform various methods disclosed herein, among other operations. It will be apparent to one skilled in the art that mobile communication device 300 may be readily implemented using, for example, processing unit 310 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Furthermore, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein may refer to code or logic implemented as hardware, such as an integrated circuit chip, Field Programmable Gate Array (FPGA), or Application Specific Integrated Circuit (ASIC). The term "article of manufacture" as used herein may also refer to code or logic implemented in a computer readable medium and accessed and executed by a processor, such as a magnetic storage medium (e.g., hard disk drives, or floppy disks, tape), optical storage (CD-ROMs or optical disks), volatile and non-volatile memory devices (e.g., EEPROMs, ROMs, PROMs, RAMs, DRAMs, SRAMs, firmware, or programmable logic.

The code in which preferred embodiments are implemented may further be accessible through a transmission media or from a file server over a network. In such cases, the article of manufacture in which the code is implemented may include, for example, a transmission media, such as a network transmission line, wireless transmission media, signals propagating through space, radio waves, or infrared signals. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Furthermore, steps may be added to the above described logic and still conform to implementations of the invention.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for generating a list of cells, said method comprising:
   receiving an indication, from a selected first network node operating at a first frequency, for indicating a second frequency of a first set of neighbor network nodes,
   wherein said second frequency is different from said first frequency, and
   wherein said indication further indicates a presence of a second network node located in said first set of neighbor network nodes;
   measuring reception quality of a signal from said second network node in response to receiving said indication; and
   receiving system information from said second network node when said reception quality exceeds a threshold;
   identifying a rate of speed of a user equipment (UE);
   identifying a set of at least two candidate neighbor network nodes based upon said received system information only when the identified rate of speed exceeds a threshold,
   wherein said set of at least two candidate neighbor network nodes is included in said first set of neighbor network nodes, and
   wherein said set of at least two candidate neighbor network nodes comprises an identity of at least one network node that is different from an identity of said second network node;
   receiving a list from said selected first network node;
   receiving a list of allowed identification tags from said second network node;
   excluding said second network node from said set of at least two candidate neighbor network nodes when an identification tag associated with said second network node is not included in said list;
   identifying a second set of neighbor network nodes that are communicating at said first frequency; and
   generating a combined neighbor list comprising said first set of neighbor network nodes and said second set of neighbor network nodes,
   wherein if a macro cell covers a specific area as a plurality of micro cells, each frequency of neighboring cells within the first set of neighbor network nodes and the second set of neighbor network nodes is represented by a center frequency and bandwidth in a specific layer,
   wherein if the specific area is covered by collocated cells for different layers, a first rule is created for determining of a combined neighbor list in a different layer from the combined neighbor list of a cell on which the UE is camping, and
   wherein if the specific area is covered by no-collocated cells for different layers, a second rule is created by adding a combined neighbor list of one or more cells, which is included in cell information, with the combined neighbor list of a cell on which the UE is camping.

2. The method according to claim 1, further comprising:
   generating a master neighbor list comprising said first set of neighbor network nodes and said set of at least two candidate neighbor network nodes.

3. The method according to claim 1, wherein said system information is received simultaneously with a communication from said selected first network node.

4. A method for generating a list of cells, said method comprising:
   communicating, from a selected first network node, an indication to a user equipment (UE) at a first frequency for indicating a second frequency of a first set of neighbor network nodes,
   wherein said second frequency is different from said first frequency, and
   wherein said indication further indicates a presence of a second network node; and
   communicating system information from said second network node to said UE when reception quality between said UE and said second network node exceeds a threshold,
   wherein said system information is for identifying a set of at least two candidate neighbor network nodes only when a rate of speed of the UE exceeds a threshold,
   wherein said set of at least two candidate neighbor network nodes is included in said set of neighbor network nodes, and
   wherein said set of at least two candidate neighbor network nodes comprises an identity of at least one network node that is different from an identity of a second network node that operates at said second frequency
   communicating a list from said selected first network node;
   communicating a list of allowed identification tags from said second network node;
   excluding said second network node from said set of at least two candidate neighbor network nodes if an identification tag associated with said second network node is not included in said list from said selected first network node,
   wherein a second set of neighbor network nodes that are communicating at said first frequency is identified by said UE,
   wherein a combined neighbor list is generated by adding said first set of neighbor network nodes and said second set of neighbor network nodes,
   wherein if a macro cell covers a specific area as a plurality of micro cells, each frequency of neighboring cells within the first set of neighbor network nodes and the second set of neighbor network nodes is represented by a center frequency and bandwidth in a specific layer,
   wherein if the specific area is covered by collocated cells for different layers, a first rule is created for determining of a combined neighbor list in a different layer from the combined neighbor list of a cell on which the UE is camping, and
   wherein if the specific area is covered by no-collocated cells for different layers, a second rule is created by adding a combined neighbor list of one or more cells, which is included in cell information, with the combined neighbor list of a cell on which the UE is camping.

* * * * *